US007928822B2

(12) United States Patent

Suzuki et al.

(10) Patent No.: US 7,928,822 B2

(45) Date of Patent: Apr. 19, 2011

(54) BOBBIN, COIL-WOUND BOBBIN, AND METHOD OF PRODUCING COIL-WOUND BOBBIN

(75) Inventors: Yuzuru Suzuki, Nagano-ken (JP); Yuuki Takahashi, Nagano-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 186 days.

(21) Appl. No.: 12/154,416

(22) Filed: May 22, 2008

(65) Prior Publication Data

US 2008/0290979 A1 Nov. 27, 2008

(30) Foreign Application Priority Data

May 23, 2007 (JP) ................................ 2007-136366

(51) Int. Cl.

| | |
|---|---|
| ***H01F 27/29*** | (2006.01) |
| ***H01F 27/30*** | (2006.01) |
| ***H01F 7/06*** | (2006.01) |
| ***H02K 15/12*** | (2006.01) |
| ***H02K 11/00*** | (2006.01) |
| ***G04C 13/11*** | (2006.01) |

(52) U.S. Cl. ............ 336/198; 336/192; 29/605; 310/44; 310/49; 310/71

(58) Field of Classification Search .................. 336/192, 336/198; 29/605; 310/44, 49

See application file for complete search history.

(56) References Cited

U.S. PATENT DOCUMENTS

| | | | | |
|---|---|---|---|---|
| 4,462,016 | A * | 7/1984 | Bland et al. | 336/192 |
| 5,359,313 | A * | 10/1994 | Watanabe et al. | 336/178 |
| 6,404,142 | B2 * | 6/2002 | Miyata et al. | 315/274 |
| 6,909,208 | B2 * | 6/2005 | Suzuki et al. | 310/49.13 |
| 7,365,629 | B2 * | 4/2008 | Furuya | 336/200 |

FOREIGN PATENT DOCUMENTS

| | | |
|---|---|---|
| JP | 01-157574 | 10/1989 |
| JP | 02-036507 | 2/1990 |
| JP | 02-172144 | 7/1990 |
| JP | 04-042757 | 2/1992 |
| JP | 05-038822 | 5/1993 |
| JP | 05-275260 | 10/1993 |
| JP | 07-041132 | 7/1995 |
| JP | H7-041132 | 7/1995 |
| JP | 09-215245 | 8/1997 |

* cited by examiner

*Primary Examiner* — Elvin G Enad

*Assistant Examiner* — Ronald W Hinson

(74) *Attorney, Agent, or Firm* — McDermott Will & Emery LLP

(57) ABSTRACT

A bobbin includes a spool portion having a hollow circular cylinder shape and adapted to have a wire wound thereon in multilayer alignment; a flange integrally disposed at one end of the spool portion; and a terminal block integrally disposed at the flange and adapted to terminate the wire, wherein a formula: $D\times N-D/2 \leqq L < D\times N+D/2$ is established where L is the effective length of the spool portion, D is the diameter of the wire, and N is the number of turns of the wire for the first layer of the multilayer alignment.

7 Claims, 10 Drawing Sheets

PRIOR ART

PRIOR ART

BOBBIN, COIL-WOUND BOBBIN, AND METHOD OF PRODUCING COIL-WOUND BOBBIN

CROSS-REFERENCE TO RELATED APPLICATIONS

This application claims priority to Japanese Patent Application No. 2007-136366, filed May 23, 2007, which is expressly incorporated herein by reference and made a part hereof.

FEDERALLY SPONSORED RESEARCH OR DEVELOPMENT

Not Applicable.

TECHNICAL FIELD

The present invention relates to a bobbin and a coil-wound bobbin, especially for use in a small stepping motor, and further to a method of producing a coil-wound bobbin having a wire wound in multilayer alignment.

BACKGROUND OF THE INVENTION

In order to increase the lamination factor of a coil, alignment winding is conventionally performed in which a wire is wound in multiple layers with adjacent wires set in tight contact with each other. In the alignment winding, however, there is a problem that a winding becomes loose due to variation in wire diameter or bobbin dimension, which lowers the lamination factor of a coil thus failing to achieve an adequate magnetomotive force.

There are a number of methods of performing alignment winding. For example, one flange of a bobbin is arranged to be slidable thereby allowing the axial dimension of a spool portion of the bobbin to flexibly vary so that a plurality of coil sections each set in multiple layers can be axially aligned (refer, for example, to Japanese Utility Model Application Publication No. H7-041132).

FIG. 1 shows a bobbin 30 disclosed in the aforementioned Japanese Utility Model Application Publication No. H7-041132.

Referring to FIG. 1, the bobbin 30 includes a spool portion 31, a stationary flange 32 fixedly disposed at one end of the spool portion 31, a movable flange 33 disposed axially slidable over the spool portion 31, and a stopper 34 formed at the other end of the spool portion 31 and adapted to prevent the movable flange 33 from dropping out.

Referring to FIG. 2 showing a winding process of a wire 35 on the bobbin 30, the movable flange 33 is set at a portion of the spool portion 31 so as to provide a distance equivalent to an integral multiple number of the diameter of the wire 35 from the stationary flange 32, a lead-out line of the wire 35 is soldered to a terminal pin 38 implanted in the stationary flange 32, and the wire 35 is alignment-wound in multiple layers around the spool portion 31 at the distance provided between the stationary flange 32 and the movable flange 33 by means of an arm 36 of an NC-controlled winding machine (not shown) thus a coil segment 37 is formed. Then, the movable flange 33 is slid toward the stopper 34 to provide the aforementioned distance from the end of the coil segment 37, and the wire 35 is alignment-wound in the same way thereby forming another coil segment 37. By repeating the process described above, a plural number of the coil segments 37 are axially arranged in a contact manner. If the wire 35 is a fusing wire, a molten resin coated on the surface of the wire 35 is fused by a heat after the winding process and cooled for solidification.

With the provision of the movable flange 33 as disclosed in the Japanese Utility Model Application Publication No. H7-041132 by which the variation of a wire diameter is absorbed at the process of forming a coil, the bobbin 30 described above allows the plural coil segments 37 to be axially arranged solidly without providing partitions thus increasing the coil lamination factor.

Another method for alignment winding is conventionally performed by using a wire winding tool including a spindle and a pair of circular cylindrical wire holders disposed to be freely telescoped over the spindle, such that the distance between the opposing faces of the pair of wire holders are appropriately set whereby alignment winding is achieved in multiple layers with a high accuracy (refer, for example, to Japanese Patent Application Laid-Open No. H4-042757).

FIG. 3 shows a bobbin 45 set on a wire winding tool 40 disclosed in the aforementioned Japanese Patent Application Laid-Open No. H4-042757, and FIG. 4 is an axial cross sectional view of the same.

The wire winding tool 40 includes a spindle 41 and a pair of wire holders 42*a* and 42*b* shaped circular cylindrical and disposed to be freely telescoped over the spindle 41. The diameter of the spindle 41 is substantially equal to or a slightly smaller than the inner diameter of a spool portion 46 of the bobbin 45. One wire holder 42*a* is disposed stationary, and the other wire holder 42*b* is disposed to be freely movable in the axial direction.

The bobbin 45 integrally includes the aforementioned spool portion 46 and a protrusion 47 disposed at one end of the spool portion 46 so as to protrude radially outwardly and adapted to function as a rotation stopper and as a terminal pin block.

The bobbin 45 is put on the spindle and telescoped thereover so that the protrusion 47 fits flush into a recess 43 of the wire holder 42*a*. Then, the wire holder 42*b* is telescoped over the spindle 41 so as to provide a predetermined distance (m) from the wire holder 42*a*, one end of a self-fusing wire W is wrapped around one of two terminal pins 48 implanted in the protrusion 47, and the wire W is wound around the spool portion 46 thereby performing alignment winding.

In the alignment winding method disclosed in the Japanese Utility Model Application Publication No. H7-041132, while the variation of the diameter of the wire or the dimension of the spool portion 31 can be absorbed, the space for winding the wire 35 is lessened by the presence of the stationary flange 32 and the movable flange 33, and this is crucial when the bobbin 30 is downsized for use in a small motor.

Recently, a stepping motor is used more and more extensively because it can be controlled easily, and with the downsizing and the enhanced performance of a device, the stepping motor for use in such the device is also required to be downsized. For example, a stepping motor with a diameter of 6 mm is used in a compact digital camera. Accordingly, the winding space of the small stepping motor is inevitably limited thus failing to generate an adequate magnetomotive force, which results in failure to achieve a sufficient torque.

On the other hand, the alignment winding method disclosed in the Japanese Patent Application Laid-Open No. H4-042757 requires the wire winding tool 40 including the wire holders 42*a* and 42*b* of high precision.

While the variation of the diameter of the wire W and the variation of the dimension of the spool portion 46 of the bobbin 45 can be absorbed by adjusting the distance (m) defined between the wire holders 42*a* and 42*b* of the wire winging tool 40, the wire holders 42*a* and 42*b* have their bore diameter set substantially equal to or slightly larger than the outer diameter of the spool portion 46 so that they can be engagingly telescoped over a portion of the spool portion 46, whereby end portions of the spool portion 46 are occupied by the wire holders 42*a* and 42*b* during the process of winding, and therefore the space for winding the wire W is axially restricted. Consequently, the magnetomotive force generated by the resulting coil formed on the spool portion 46 of the bobbin 45 is also restricted.

Also, the resulting coil has its axial dimension smaller than the length of the spool portion 46 leaving an open space at the end portions of the spool portion 46 and may possibly be allowed to undesirably move in the axial direction, for example, at the time of assembly process. Further, the coil does not have flanges or like members thus allowing its both end faces to be substantially exposed, and therefore may possibly be loosened, deformed or damaged at the time of assembly process and the like.

SUMMARY OF THE INVENTION

The present invention has been made in light of the above problems, and it is an object of the present invention to provide a bobbin which allows an increase in the number of coil turns while absorbing variation in a wire diameter and variation in a bobbin dimension to thereby successfully achieve alignment winding in multiple layers, and also to provide a method for forming a coil of multilayer alignment on the bobbin described above thus producing a coil-wound bobbin.

According to a first aspect of the present invention, there is provided a bobbin which includes: a spool portion having a hollow circular cylinder shape and adapted to have a wire wound thereon in multilayer alignment; a flange integrally disposed at one end of the spool portion; and a terminal block integrally disposed at the flange and adapted to terminate the wire.

In the first aspect of the present invention, a formula: $D\times N-D/2\leqq L<D\times N+D/2$ may be established where L is the effective length of the spool portion, D is the diameter of the wire, and N is the number of turns of the wire for the first layer of the multilayer alignment.

In the first aspect of the present invention, the bobbin may include: two spool portions having a hollow circular cylinder shape, integrally connected to each other on an end-to-end basis in the axial direction, and each adapted to have a wire wound thereon in multilayer alignment; two flanges each integrally disposed at the connected end of each of the two spool portions; and a terminal pin block integrally disposed at the two flanges in a bridging manner and adapted to terminate the wire, wherein two inner yokes each having a plurality of pole teeth at its inner circumference are insert-molded with the bobbin, and wherein a formula: $D\times N-D/2\leqq L<D\times N+D/2$ is established where L is the effective length of each of the two spool portions, D is the diameter of the wire, and N is the number of turns of the wire for the first layer of the multilayer alignment for each spool portion.

In the first aspect of the present invention, a wire guide groove may be provided at the flange and the terminal block.

According to a second aspect of the present invention, there is provided a coil-wound bobbin which includes: bobbin including a spool portion having a hollow circular cylinder shape, a flange integrally disposed at one end of the spool portion, and a terminal block disposed at the flange and adapted to terminate a wire; and a coil disposed on the bobbin such that a self-fusing wire is wound on the spool portion of the bobbin in multilayer alignment, wherein a formula: $D\times N-D/2\leqq L<D\times N+D/2$ is established where L is the effective length of the spool portion, D is the diameter of the wire, and N is the number of turns of the wire for the first layer of the multilayer alignment.

In the second aspect of the present invention, the coil-wound bobbin may be used in a stepping motor.

According to a third aspect of the present invention, there is provided a method of producing a coil-wound bobbin, in which a coil is disposed around a bobbin which includes: a spool portion having a hollow circular cylinder shape; a flange integrally disposed at one end of the spool portion; and a terminal block disposed at the flange, having a plurality of terminal pins implanted therein, and adapted to terminate a wire, wherein the method includes steps of: (a) placing the bobbin on a spindle of a wire winding machine; (b) setting a wire holder of the wire winding machine so as to provide a distance equal to an integral multiple of the diameter of the wire from the flange of the bobbin; (c) wrapping the starting lead-out line of the wire around one terminal pin of the plurality of terminal pins, guiding the starting lead-out line in contact with the flange to the spool portion of the bobbin, forming the first turn for the first layer of the coil around the spool portion, forming the second turn for the first layer in tight contact with the first turn until filling up the distance provided thereby completing a predetermined number of turns for the first layer, forming the second layer of the coil by making a necessary number of turns in the opposite direction until completing a predetermined number of layers, and wrapping the finishing lead-out line of the wire around another terminal pin of the plurality of terminal pins; and (d) detaching the wire holder of the wire winding machine from the coil, and releasing the bobbin having the wire wound therearound thus finishing a coil-wound bobbin.

In the third aspect of the present invention, the wire may be a self-fusing wire, and the method may further include a step of fusing the wire either after the wire is wound around the spool portion or while the wire is being wound around the spool portion.

And, in the third aspect of the present invention, the wire may be fused by either heat or alcohol.

According to the present invention, there is provided a bobbin which allows an increase in the number of turns of a coil wound on the bobbin in multilayer alignment while the variation of the wire diameter and the bobbin dimension is absorbed. Consequently, the lamination factor of the coil can be improved, and if the bobbin described above is used in a stepping motor, the torque performance can be maintained or even enhanced in the effort of downsizing.

DETAILED DESCRIPTION

Exemplary embodiments of the present invention will hereinafter be described with reference to the accompanying drawings.

A first embodiment of the present invention will be described with reference to FIGS. 5 and 6.

Figure 1:
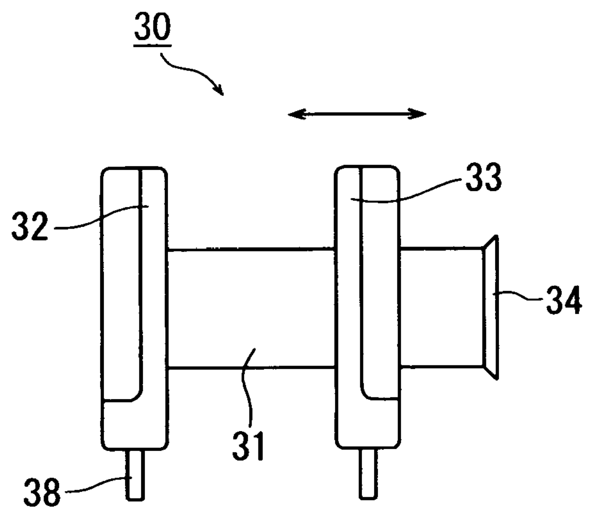
FIG. 1 is a side view of a conventional bobbin.
Figure 2:
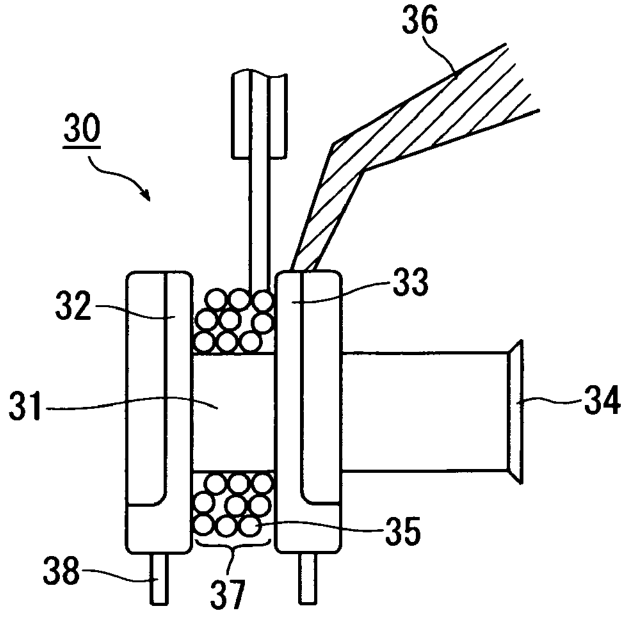
PRIOR ART FIG. 2
FIG. 2 is an explanatory side view of the bobbin of FIG. 1 around which a coil is formed.
Figure 3:
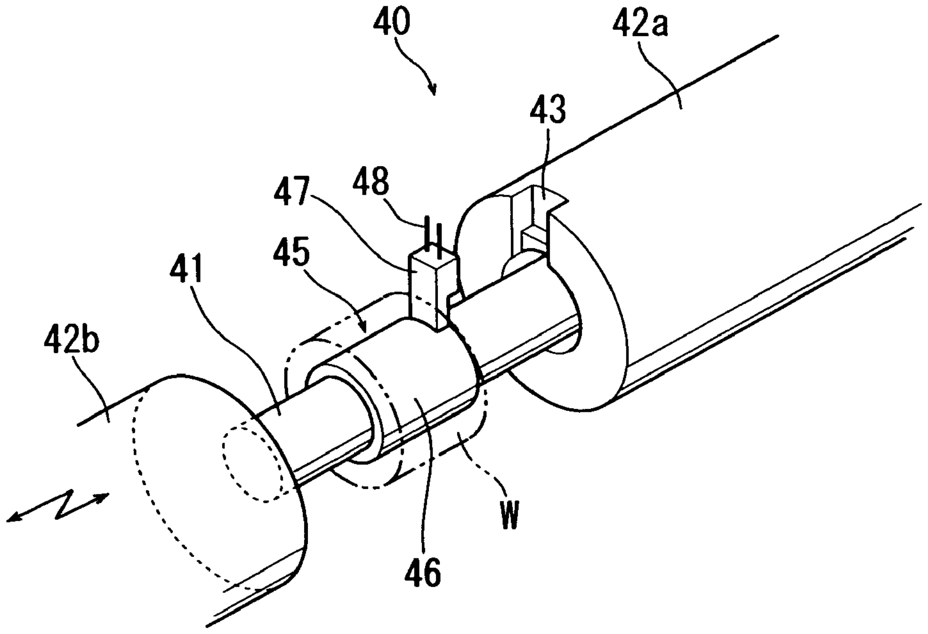
FIG. 3 is an explanatory perspective view of another conventional bobbin set on a wire winding tool.
Figure 4:
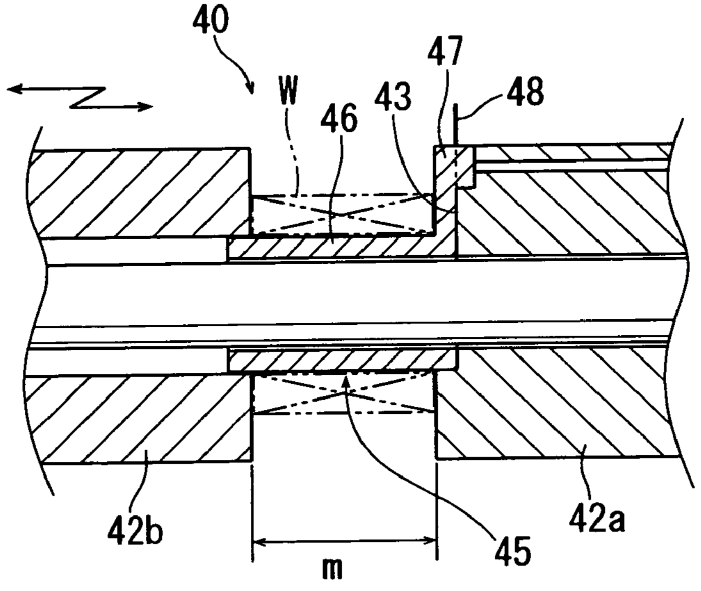
PRIOR ART FIG. 4
FIG. 4 is a schematic axial cross sectional view of FIG. 3.
Figure 5:
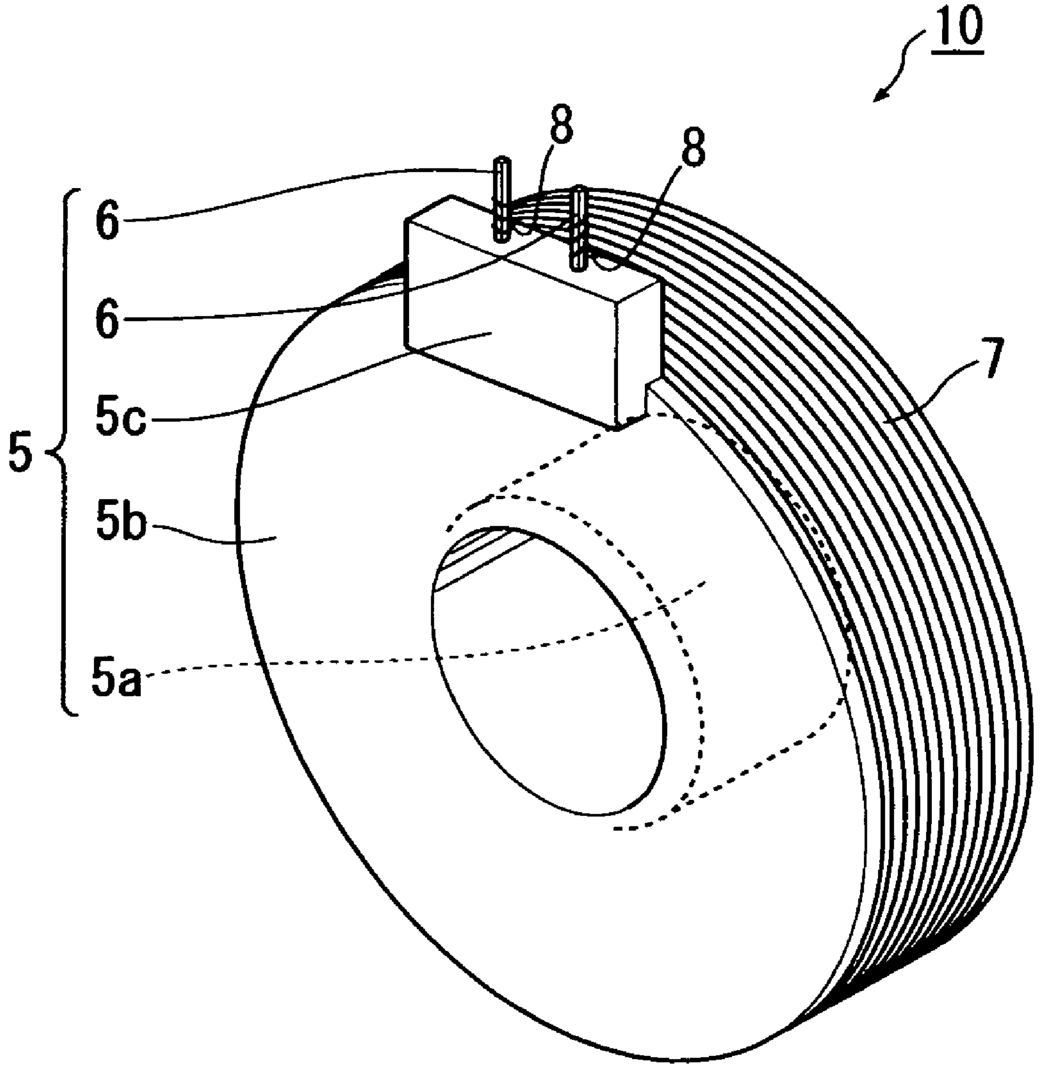
FIG. 5 is a perspective view of a bobbin with a coil according to a first embodiment of the present invention.

Referring to FIG. 5, a bobbin 5 according to the first embodiment is made of a non-magnetic synthetic resin (for example, liquid crystal polymer) by resin molding and integrally includes a spool portion 5*a*, a flange 5*b* disposed at one end of the spool portion 5*a*, and a terminal pin block 5*c* having a plurality (two in the figure) of terminal pins 6. Thus, no flange is provided at the other end of the spool portion 5*a*. Also shown in FIG. 5 is a coil 7 which is formed such that a wire 8 is wound around the spool portion 5*a* of the bobbin 5, thus a coil-wound bobbin 10 is structured.

Figure 6:
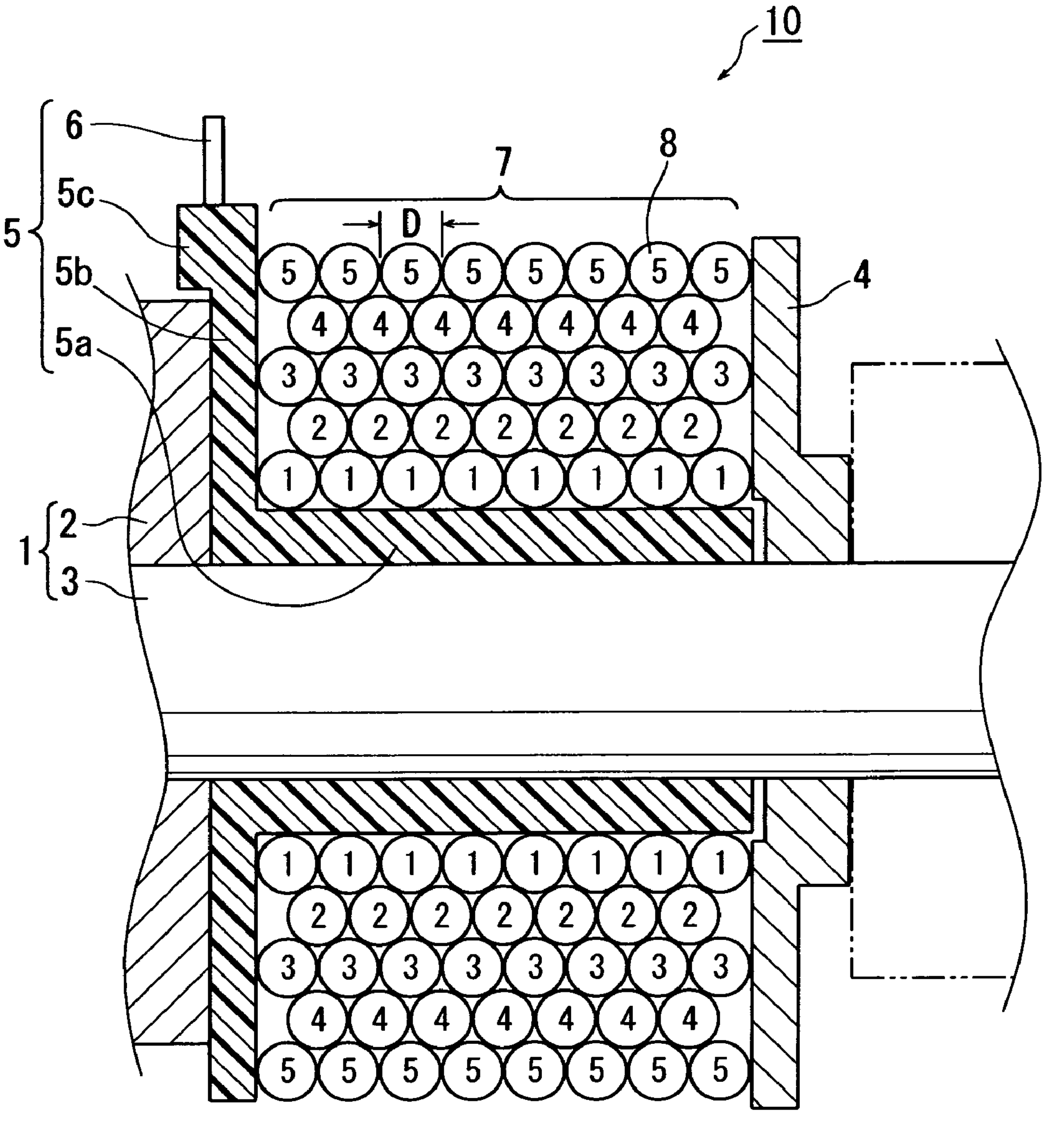
FIG. 6 is a schematic axial cross sectional view of the bobbin and the coil of FIG. 5.

Referring to FIG. 6, a wire winding machine (not shown) includes a spindle 1 which includes an outer portion 2 having a hollow and an inner portion 3 inserted in the hollow of the outer portion 2. The wire winding machine further includes a wire holder.

The bobbin 5 is put on the inner portion 3 of the spindle 1 and telescoped thereover so that the flange 5*b* is brought into contact with the end face of the outer portion 2 of the spindle 1, whereby the bobbin 5 is set in place on the inner portion 3. Then, the wire holder 4 is put on the inner portion 3, telescoped thereover and positioned so as to provide a distance equal to N-fold of a diameter D of the wire 8 (N is a natural number) between the flange 5*b* and the wire holder 4. Figures in circles each showing the wire 8 indicate the layer numbers of the coil 7.

Description will now be made of the process of winding the wire 8 on the bobbin 5 in multilayer alignment.

As will be described herein later, if an effective axial length L of the spool portion 5*a* is determined substantially equal to the distance obtained by D×N as described above, the coil 7 can be formed with its axial length measuring without excess or deficiency with respect to the effective axial length L of the spool portion 5*a*.

One lead-out line of the wire 8 of a self-fusing wire is wrapped around one terminal pin 6, then the wire 8 is guided to the spool portion 5*a* while making contact with the flange 5*b* and wound on the spool portion 5*a* in eight turns with adjacent turns set in tight contact with each other thus forming a first layer of the coil 7.

The last turn of the first layer is firmly held by the wire holder 4, and the wire 8 is laid over the first layer and wound in the opposite direction thereby forming a second layer on the first layer, wherein the wire 8 of each turn of the second layer sits in a recess formed between two wires 8 of adjacent turns of the first layer thus making adjacent turns into a tight contact with one another. Then, subsequent layers are formed in the same manner to complete a predetermined number of layers (five layers in FIG. 6) for the coil 7. And, the other lead-out line of the wire 8 is wrapped around the other terminal pin 6.

After the other lead-out line of the wire 8 is wrapped around the other terminal pin 6, the wire holder 4 is detached from the coil 7 formed on the bobbin 5 (moved toward the right in the figure), and the inner portion 3 of the spindle 1 is drawn inside the outer portion 2 thereby releasing the bobbin 5 from the spindle 1.

After the bobbin 5 is released from the spindle 1, the terminal pins 6 having the lead-out lines of the wire 8 wrapped therearound are dipped in molten solder in a solder bath for soldering.

In the present embodiment, the wire 8 is a self-fusing wire to be fused by applying heat using a heating device for solidification but may alternatively be an alcohol-fused wire. The wire 8 may be fused while the coil 7 is being formed or fused after the coil 7 is completed. In the latter case, if the coil 7 completed is pressed by the wire holder 4 toward the flange 5*b* for the predetermined position while the wire 8 is fused, then the predetermined axial length of the coil 7 can be flexibly obtained even if the wire 8 has a slightly oversized diameter. The timing of the process of fusing the wire 8 may be optimally selected in view of all the conditions.

In the present embodiment described above, even if there is variation in the diameter D of the wire 8 or in the dimension of the spool portion 5*a* of the bobbin 5, the wire holder 4 which functions as a temporary flange for the bobbin 5 can be flexibly positioned to provide a distance equal to an integral multiple number of the diameter D of the wire 8, whereby the coil 7 is wound in multilayer alignment without becoming loosened.

If the effective axial length of a spool portion of a bobbin is larger than the axial dimension of a coil thus leaving an open area at the axial end portion of the spool portion as conventionally seen, the coil may possibly move and vibrate when incorporated in a motor. In the present embodiment, the effective length L of the spool portion 5*a* of the bobbin 5 is defined to range as shown by a formula: $D \times N - D/2 \leqq L < D \times N + D/2$.

In the present embodiment, when the wire 8 having the diameter D is wound, the wire holder 4 is positioned at the distance obtained by D×N from the flange 5*b*, whereby the wire 8 can be wound on the spool portion 5*a* with N turns in the axial direction thus forming the coil 7 on the spool portion 5*a* without excess and deficiency. Consequently, the coil 7 is prevented from moving and vibrating.

Figure 7:
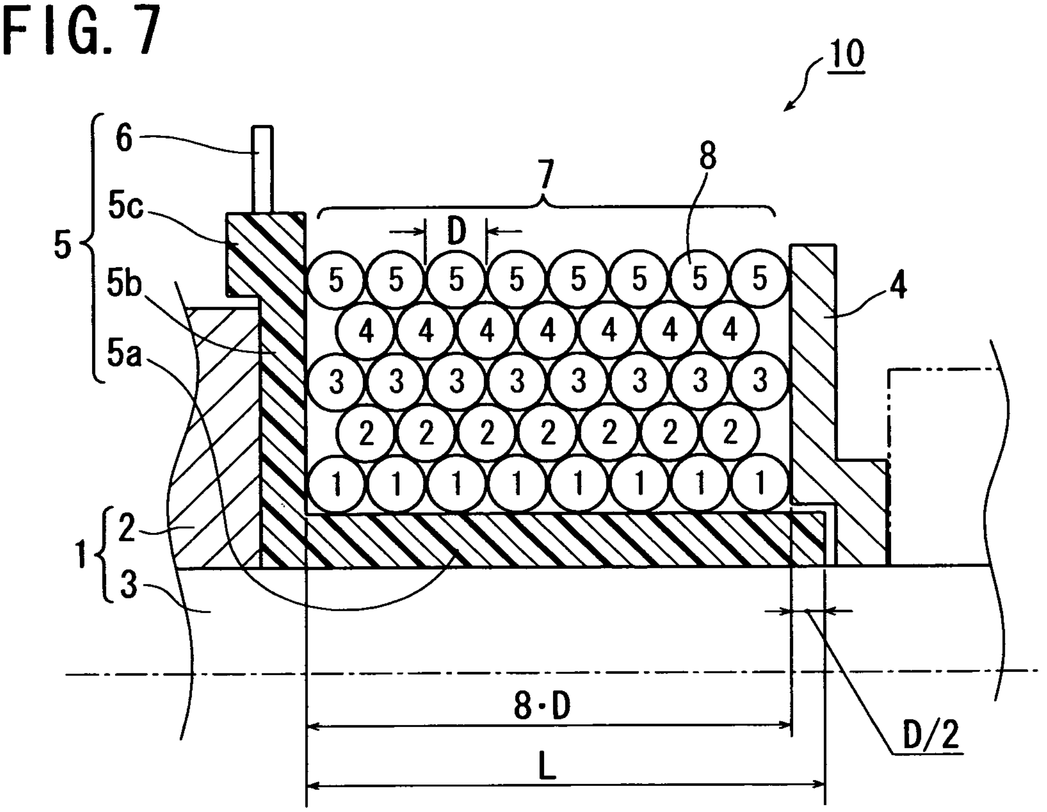
FIG. 7 is a schematic axial cross sectional view of a bobbin and a coil similar to FIG. 6, showing $L=D\times N+D/2$, where L is an effective axial length of the bobbin, D is a diameter of a wire of the coil, and N is an integer to show a number of turns for a first layer of the coil (N=8 in the figure)
Figure 8:
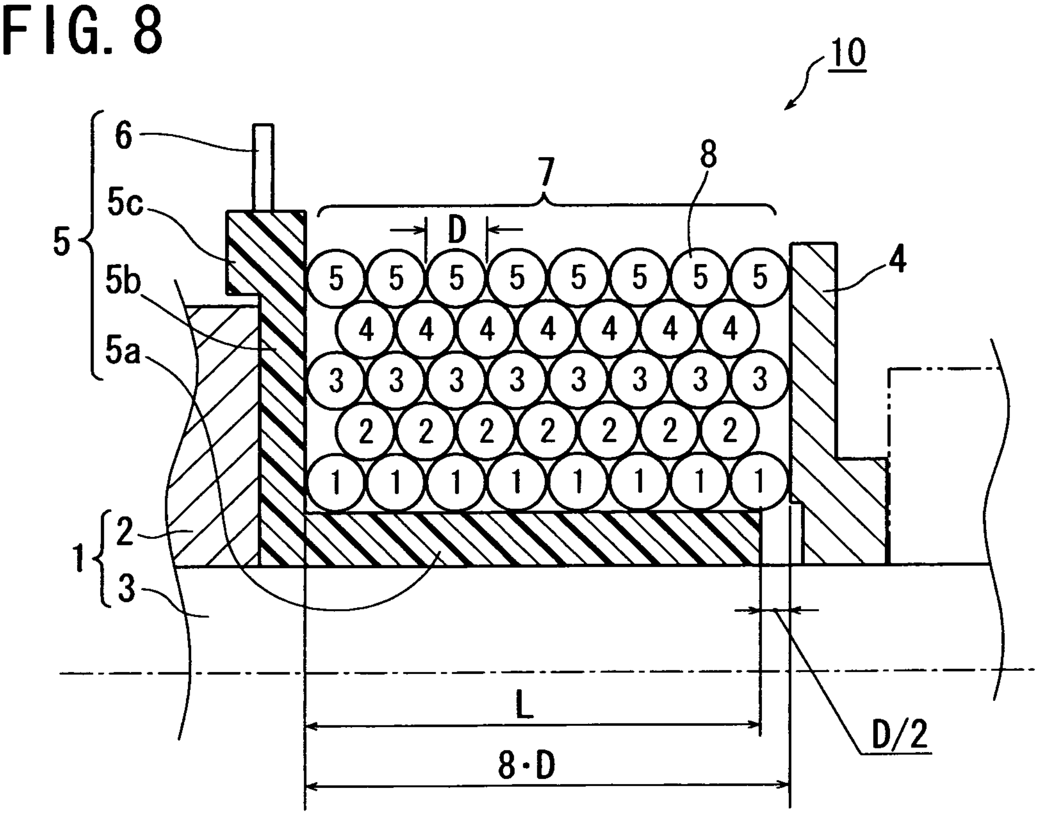
FIG. 8 is a schematic axial cross sectional view of a bobbin and a coil similar to FIG. 6, showing L=D×N−D/2(N=8 in the figure)

Description will be further made of the effective length L of the spool portion 5*a* of the bobbin 5 with reference to FIGS. 7 and 8.

FIG. 7 is a schematic axial cross sectional view of a bobbin and a coil similar to FIG. 6 where L=D×N+D/2 (N=8 in the figure), and FIG. 8 is a schematic axial cross sectional view of a bobbin and a coil similar to FIG. 6 where L=D×N−D/2 (N=8 in the figure).

When the effective length L of the spool portion 5*a* is set to a dimension obtained by "D×8+D/2" (L=D×8+D/2) as shown in FIG. 7, another turn of the wire 8 is allowed to be wound for the first layer, that is to say N can be 9 rather than 8, and accordingly the effective length L is set to be less than a dimension which is obtained by "D×8+D/2" (L<D×N+D/2) as defined in the aforementioned formula. On the other hand, when the effective length L is set to be less than a dimension which is obtained by "D×8−D/2" (L<D×8−D/2), the eighth turn of the wire 8 for the first layer, which can stay on the spool portion 5*a* when the effective length L is set exactly to a dimension obtained by "D×8−D/2" (L=D×8−D/2) as shown in FIG. 8, fails to stay on the spool portion 5*a*, and accordingly the effective length L must be at least equal to the dimension which is obtained by "D×8−D/2" (L≧D×8−D/2) as defined in the aforementioned formula.

In the present embodiment, the coil 7 is made of the wire 8 which is a self-fusing wire, and the bobbin 5 includes only one flange, that is the flange 5*b*, disposed on one end of the spool portion 5*a* while the wire holder of the wire winding machine serves temporarily as another flange of the bobbin 5 during the winding operation without occupying any portion of the spool portion 5*a*. As a result, the bobbin 5 has an increased winding space at the spool portion 5*a* compared with a same sized bobbin having two flanges at both ends of a spool portion and therefore allows an increased number of turns of the wire 8 thus increasing the magnetomotive force while successfully maintaining the shape of the coil 7 formed.

Consequently, when the bobbin 5 having the coil 7 wound therearound as described above is used in a motor, an enhanced torque performance can be achieved in the effort of downsizing the motor.

Description will now be made on a stepping motor which incorporates the bobbin 5 having the coil 7 of FIG. 5 wound therearound with reference to FIGS. 9, 10 and 11.

Figure 9:
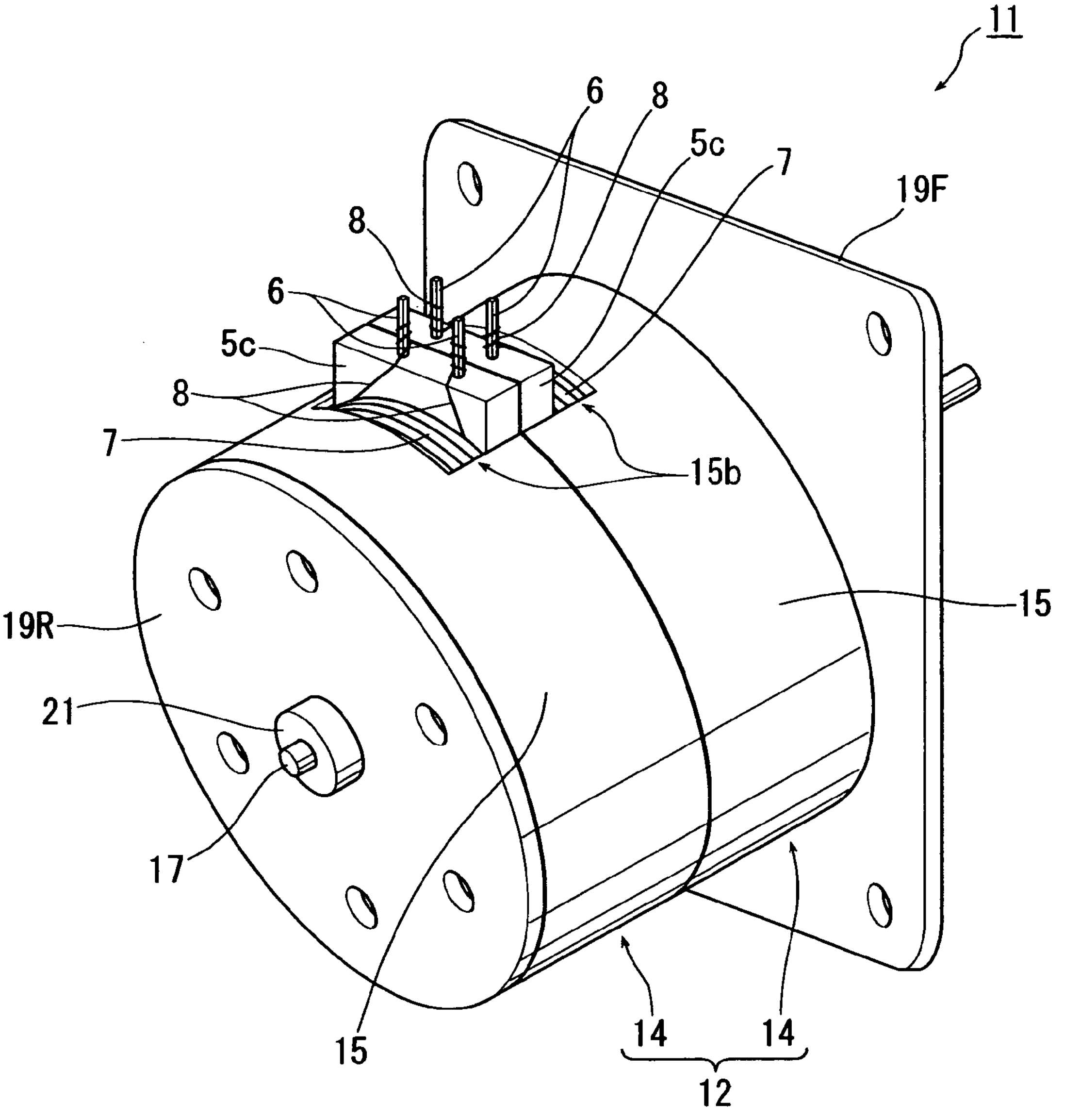
FIG. 9 is a perspective view of a claw pole type PM (permanent magnet) stepping motor including the bobbin and the coil of FIG. 5.
Figure 10:
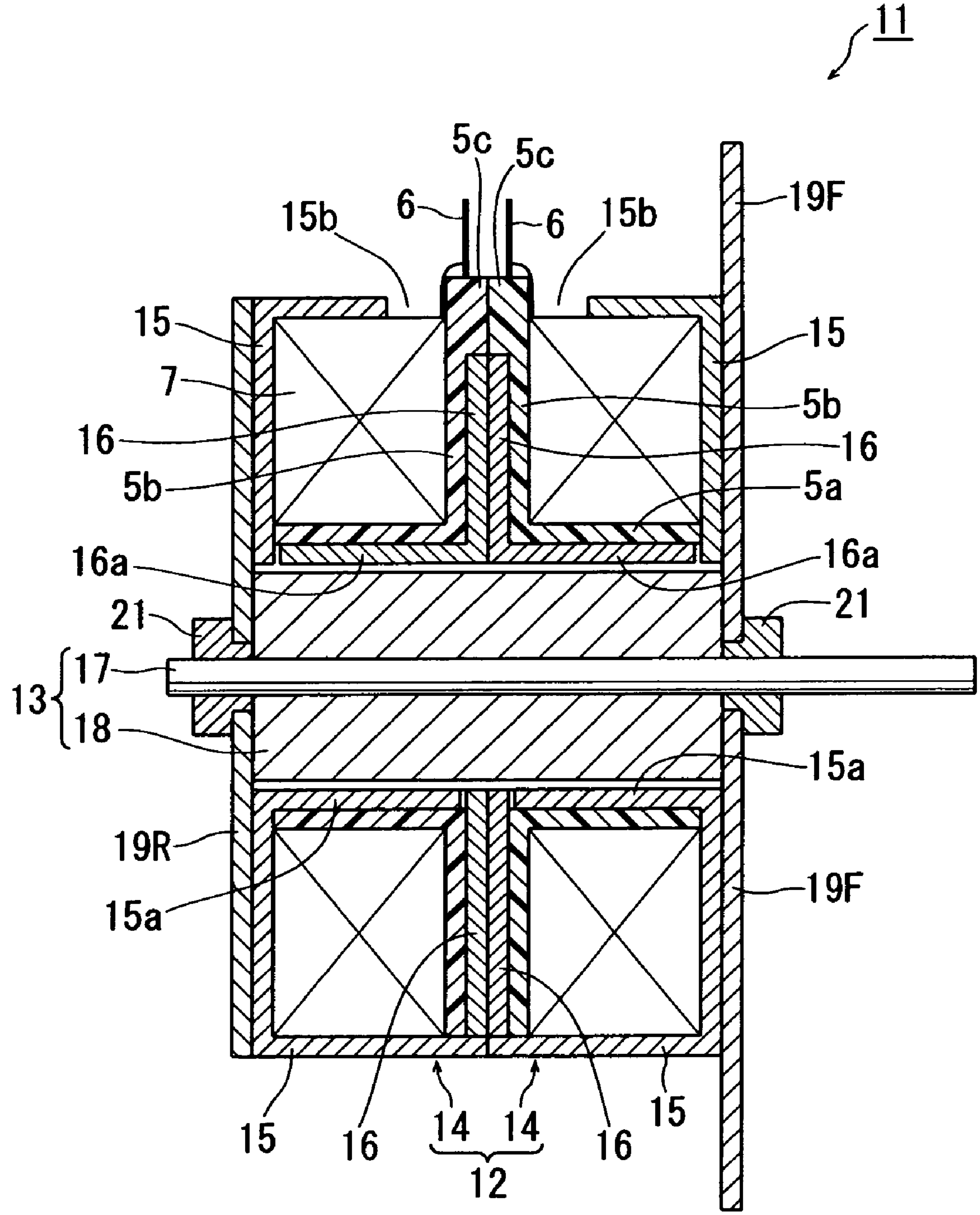
FIG. 10 is a cross sectional view of the stepping motor of FIG. 9.
Figure 11:
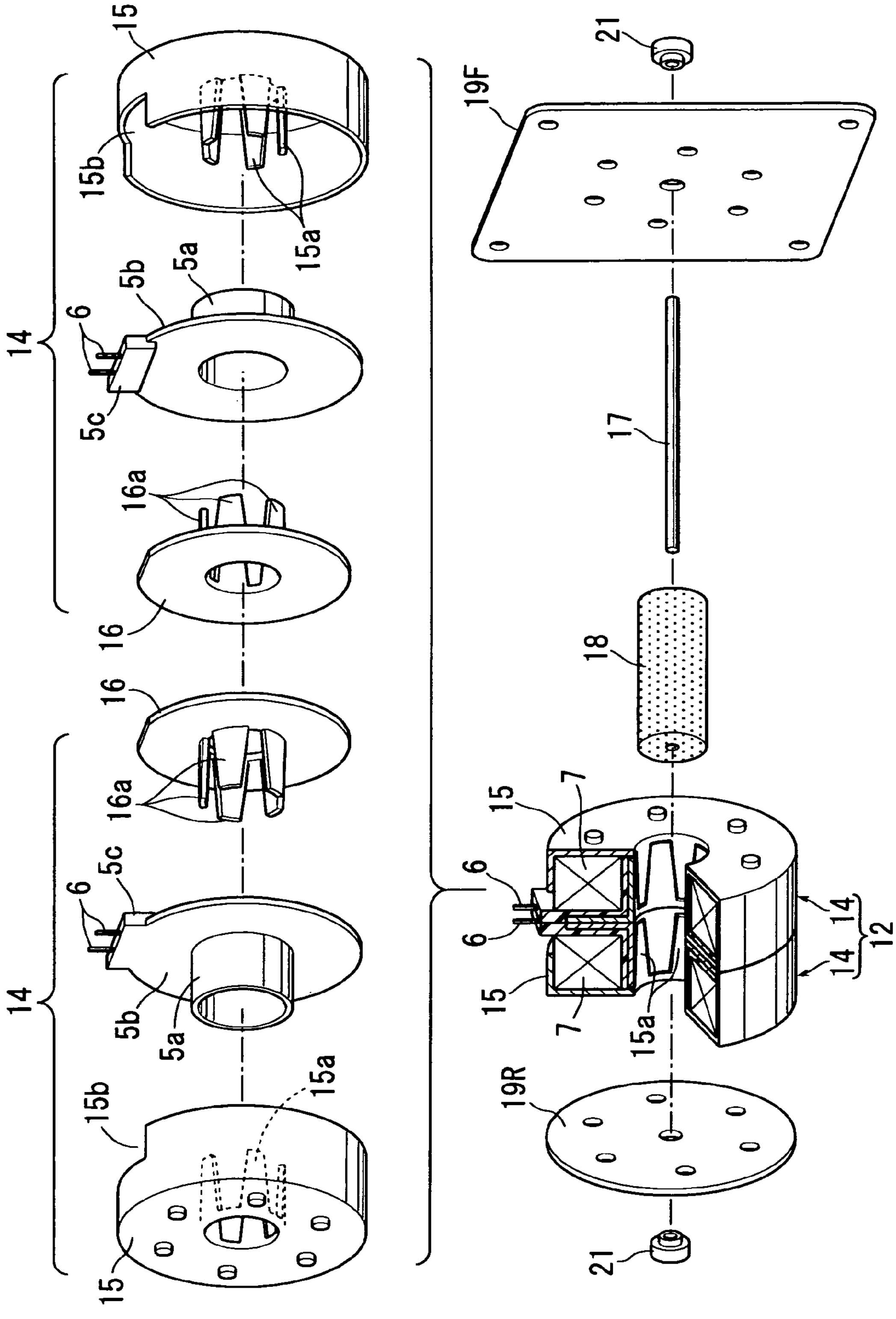
FIG. 11 is an exploded perspective view of the stepping motor of FIG. 9.

Referring to FIGS. 9, 10 and 11, a claw pole type PM (permanent magnet) stepping motor 11 generally includes a stator assembly 12 and a rotor assembly 13. The stator assembly 12 is basically structured such that two stator units 14 and 14 are coupled to each other end-to-end thus forming a two phase stator. The rotor assembly 13 includes a shaft 17 and a magnet (for example, rare earth bonded magnet) 18 which is adhesively fixed to the shaft 17 and which has multipole magnetization in the circumferential direction at its outer circumference. The rotor assembly 13 is rotatably disposed inside the stator assembly 12 such that the shaft 17 is rotatably supported by two bearings 21 attached to a front plate 19F and a rear plate 19R, respectively.

Each of the two stator units 14 includes an outer yoke 15 shaped like a cup, an inner yoke 16, and a coil 7 wound around a bobbin 5 (equivalent to the coil 7 and the bobbin 5 described above).

The outer yoke 15 is made of a soft magnetic material and has a plurality of pole teeth 15*a* at its inner circumference and an open portion 15*b* at its outer circumference for allowing a terminal block 5*c* of the bobbin 5 to stick out therethrough. The inner yoke 16 is also made of a soft magnetic material and has a plurality of pole teeth 16*a* at its inner circumference. The outer yoke 15 and the inner yoke 16 are coupled to each other such that their respective pole teeth 15*a* and 16*a* intermesh with each other with a phase difference of 180 degrees by electrical angle, and the pole teeth 15*a* and 16*a* intermeshing with each other oppose the outer circumference of the magnet 18 of the rotor assembly 13 with a predetermined gap therebetween. The two stator units structured as described above are coupled to each other with a phase difference of 90 degrees.

Since the bobbin 5 includes a flange 5*b* disposed only at one end of a spool portion 5*a*, the number of turns of a wire 8 can be increased for a space saved by not providing another flange while alignment winding is duly performed, whereby the lamination factor of the coil 7 is increased which results in increasing the magnetomotive force of the coil 7. This structure contributes to maintaining or even enhancing the torque performance of a motor downsized.

The bobbin and the coil according to the present invention can be used not only for the type of the stepping motor shown in FIG. 9 but for various types of motors.

A second embodiment of the present invention will be described with reference to FIGS. 12A and 12B.

Figure 12A:
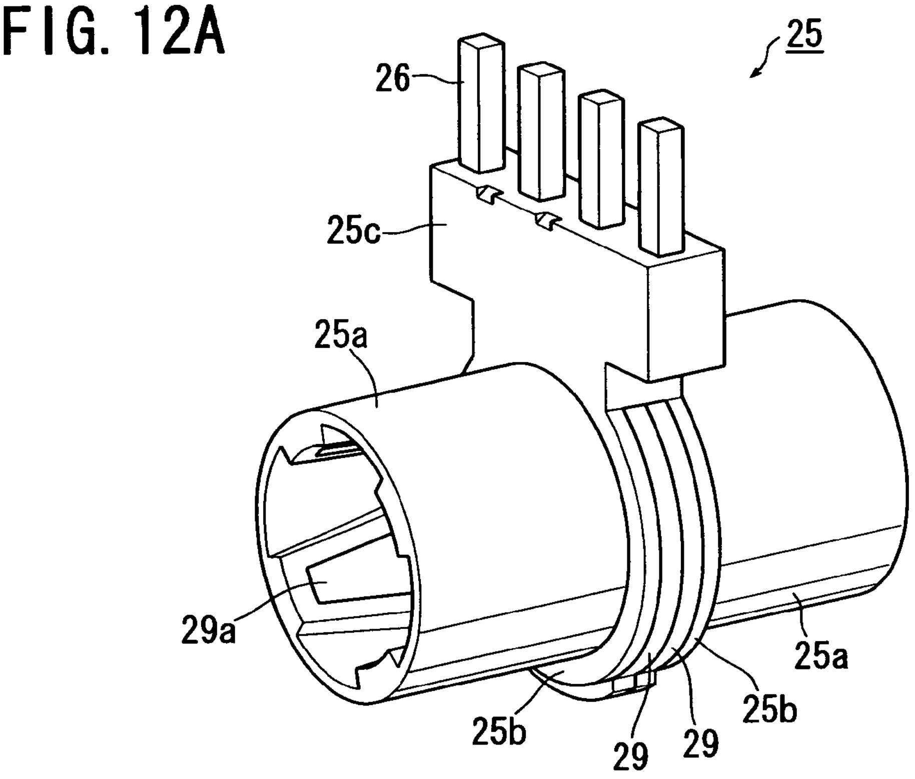
FIG. 12A is a perspective view of a bobbin according to a second embodiment of the present embodiment.

Referring to FIG. 12A, a bobbin 25 according to the second embodiment is a double bobbin integrally including two spool portions 25*a* and 25*a*. Two inner yokes 29 and 29, which are made of a soft magnetic material and each include a ring shaped body and a plurality of pole teeth 29*a* disposed at its inner circumference, are insert-molded with the bobbin 25 such that their ring shaped bodies are disposed in contact to each other and that their respective pole teeth 29*a* and 29*a* are disposed respectively at the inner surfaces of the two spool portions 25*a* and 25*a* and extend axially outwardly. The bobbin 25 further integrally includes two flanges 25*b* and 25*b* disposed to sandwich the ring shaped bodies of the inner yokes 29 and 29, and a terminal block 25*c* protruding radially outwardly from both of the two flanges 25*b* and 25*b* so as to bridge between the two flanges 25*b* and 25*b* over the ring shaped bodies of the inner yokes 29 and 29. A plurality (four in the figure) of terminal pins 26 are implanted in the terminal block 25*c*.

The bobbin 25 is made of a non-magnetic synthetic resin (for example, liquid crystal polymer) and has the two flanges 25*b* and 25*b* only at the center area as shown in FIG. 12A, specifically at the respective proximal end portions of the spool portions 25*a* and 25*a*, and no flange is provided at the distal end of each of the two spool portions 25*a* and 25*a*.

Figure 12B:
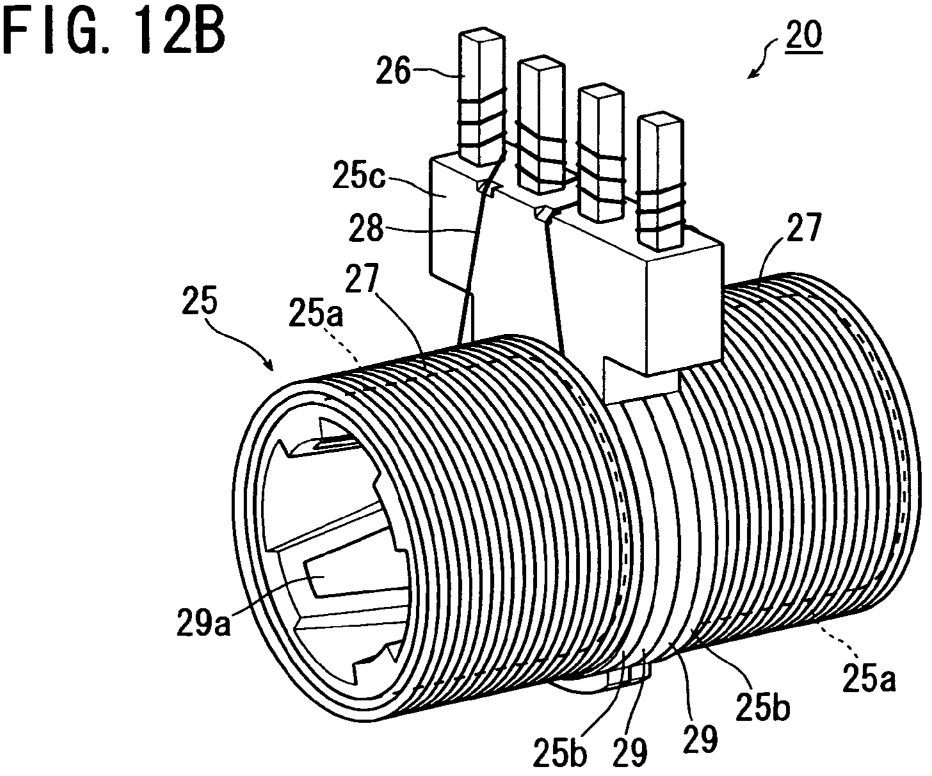
FIG. 12B is a perspective view of the bobbin of FIG. 12A having a coil therearound.

Referring to FIG. 12B, a wire 28 is wound on each of the two spool portions 25*a* and 25*a* by a wire winding machine similar to as shown in FIG. 6 thereby forming each of two coils 27, thus a coil-wound bobbin 20 is completed.

An outer yoke (not shown) which is made of a soft magnetic material and has a plurality of pole teeth on its inner circumference and an open portion at its outer circumference for allowing the terminal block 25*c* to stick out therethrough is attached to each spool portion 25*a* having the coil 27 thereon such that their pole teeth intermesh with the pole teeth 29*a* of the inner yoke 29. In this connection, the pole teeth of the outer yoke (not shown) are precisely positioned in place according to recesses formed at the inner surface of the spool portion 25*a* when the inner yokes 29 and 29 are insert-molded with the bobbin 25.

A third embodiment of the present invention will be described with reference to FIGS. 13A and 13B.

The third embodiment differs from the second embodiment in that a wire guide groove is formed at a terminal block and a flange through to a spool portion.

Figure 13A:
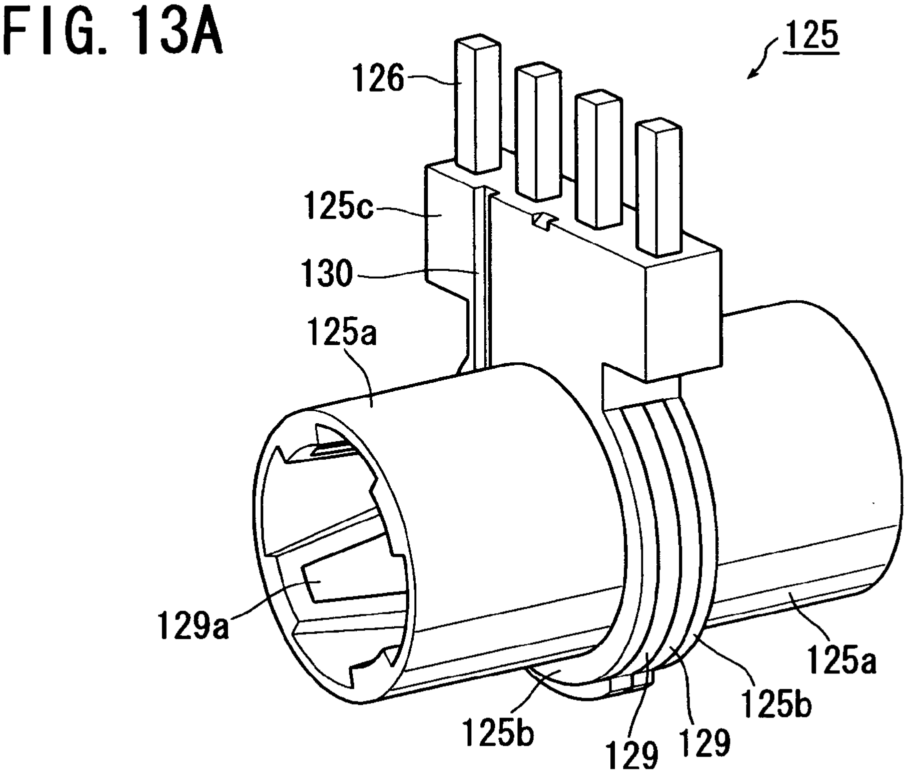
FIG. 13A is a perspective view of a bobbin according to a third embodiment of the present invention.

Referring to FIG. 13A, a bobbin 125 according to the third embodiment is structured and formed by insert-molding in the same way as the bobbin 25 according to the second embodiment except that a wire guide groove 130 is formed at a flange 125*b* and a terminal block 125*c* of the bobbin 125 at the process of the resin molding so as to communicate with a spool portion 125*a*.

Figure 13B:
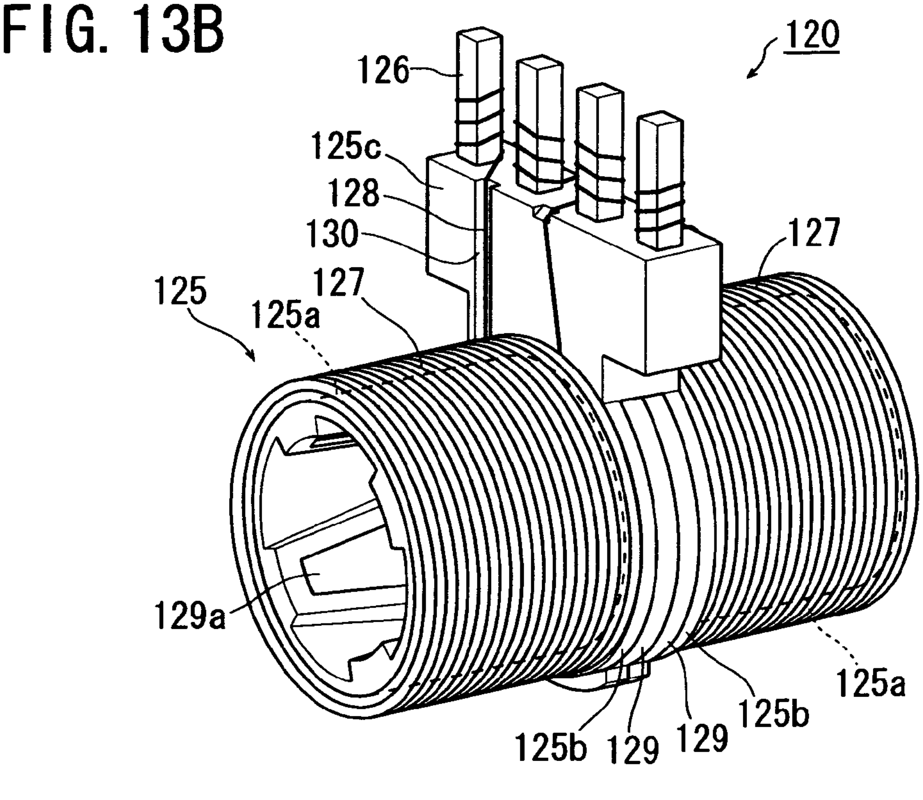
FIG. 13B is a perspective view of the bobbin of FIG. 13A having a coil therearound.

Referring to FIG. 13B, a wire 128 from a terminal pin 126 is guided to the spool portion 125*a* through the wire guide groove 130 and wound on the spool portion 125*a* to form a coil 127, thus a coil-wound bobbin 120 is completed.

Thanks to the wire guide groove 130, the lead-out line of the wire 128 fits in the flange 125*b* and the terminal block 125*c* thereby preventing troubles at the winding process thus successfully achieving alignment winding. This wire guide groove structure is applicable also to the bobbin 5 of FIG. 5 according to the first embodiment, though not illustrated nor described in conjunction therewith.

While the present invention has been illustrated and explained with respect to specific embodiments thereof, it is to be understood that the present invention is by no means limited thereto but encompasses all changes and modifications that will become possible within the spirit of the invention. For example, since one end of the bobbin according to the present invention is open without a flange, an air-core coil which is made of a self-fusing wire and formed separately may be put on the spool portion.

What is claimed is:

1. A bobbin comprising:

two spool portions having a hollow circular cylinder shape, axially aligned to each other with an end-to-end basis, and each adapted to have a wire wound thereon in multilayer alignment;

two flanges each integrally disposed only at a proximal end of each of the two spool portions; and a terminal block integrally formed on the two flanges so as to bridge between the two flanges and adapted to terminate the wire, wherein the two spool portions, the two flanges and the terminal block are integrally formed by resin molding, wherein two inner yokes each having a plurality of pole teeth at its inner circumference are insert-molded with the bobbin.

2. A bobbin according to claim 1, wherein a formula: $D \times N - D/2 \leqq L < D \times N + D/2$ is established where L is an effective length of each of the two spool portions, D is a diameter of the wire, and N is a number of turns of the wire for a first layer of the multilayer alignment for each spool portion.

3. A method of producing a coil-wound bobbin in which a bobbin comprises:

a spool portion having a hollow circular cylinder shape;

a flange integrally disposed only at one end of the spool portion; and a terminal block disposed on the flange, having a plurality of terminal pins implanted therein, and adapted to terminate a wire, the method comprising steps of:

(a) placing the bobbin on a spindle of a wire winding machine;

(b) setting a wire holder of the wire winding machine so as to provide a distance equal to an integral multiple of a diameter of the wire from the flange of the bobbin;

(c) wrapping a starting lead-out line of the wire around one terminal pin of the plurality of terminal pins, guiding the starting lead-out line in contact with the flange to the spool portion of the bobbin, forming a first turn for a first layer of the coil around the spool portion, forming a second turn for the first layer in tight contact with the first turn until filling up the distance provided thereby completing a predetermined number of turns for the first layer, forming a second layer of the coil by making a necessary number of turns in an opposite direction until completing a predetermined number of layers, and wrapping a finishing lead-out line of the wire around another terminal pin of the plurality of terminal pins; and (d) detaching the wire holder of the wire winding machine from the coil, and releasing the bobbin having the wire wound therearound thus finishing a coil-wound bobbin.

4. A method of producing a coil-wound bobbin according to claim 3, wherein the wire is a self-fusing wire, and the method further comprises a step of fusing the wire after the wire is wound around the spool portion.

5. A method of producing a coil-wound bobbin according to claim 3, wherein the wire is a self-fusing wire, and the method further comprises a step of fusing the wire while the wire is being wound around the spool portion.

6. A method of producing a coil-wound bobbin according to claim 4, wherein the wire is fused by one of heat and alcohol.

7. A method of producing a coil-wound bobbin according to claim 5, wherein the wire is fused by one of heat and alcohol.

* * * * *